United States Patent
Rajagopalan

(10) Patent No.: US 6,469,105 B1
(45) Date of Patent: *Oct. 22, 2002

(54) COMPOSITIONS USEFUL FOR FORMING THE LAYERS OF A GOLF BALL AND METHOD OF MAKING SAME

(75) Inventor: Murali Rajagopalan, South Dartmouth, MA (US)

(73) Assignee: Acushnet Company, Fairhaven, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/607,620

(22) Filed: Jun. 30, 2000

Related U.S. Application Data

(63) Continuation-in-part of application No. 09/215,370, filed on Dec. 18, 1998, now Pat. No. 6,121,384, which is a division of application No. 08/978,510, filed on Nov. 25, 1997, now Pat. No. 5,869,578, which is a continuation of application No. 08/560,763, filed on Nov. 21, 1995, now abandoned.

(51) Int. Cl.$^7$ .................... A63B 37/02; A63B 37/06; A63B 37/12
(52) U.S. Cl. .................. 525/330.6; 525/221; 473/354; 473/371; 473/372; 473/373; 473/374; 473/378; 473/385
(58) Field of Search .................. 525/221, 330.6; 473/371, 372, 373, 374, 378, 385, 354

(56) References Cited

U.S. PATENT DOCUMENTS

| | | |
|---|---|---|
| 2,924,593 A | 2/1960 | Breslow |
| 3,264,272 A | 8/1966 | Rees .................... 260/78.5 |
| 3,472,825 A | 10/1969 | Walter et al. .......... 260/88.1 |
| 3,819,768 A | 6/1974 | Molitor ................ 260/897 B |
| 3,926,891 A | 12/1975 | Gross et al. .......... 260/29.6 E |
| 3,970,626 A | 7/1976 | Hurst et al. ......... 260/29.6 WB |
| 4,274,637 A | 6/1981 | Molitor ................ 273/235 R |
| 4,323,247 A | 4/1982 | Keches et al. ......... 273/235 R |
| 4,431,193 A | 2/1984 | Nesbitt .................. 273/235 R |
| 4,473,665 A | 9/1984 | Martini-Vvedensky et al. ............ 521/79 |
| 4,508,309 A | 4/1985 | Brown .................... 249/81 |
| 4,526,375 A | 7/1985 | Nakade .................. 273/235 R |
| 4,638,034 A | 1/1987 | McClain ................ 525/369 |
| 4,884,814 A | 12/1989 | Sullivan ................ 273/235 R |
| 4,911,451 A | 3/1990 | Sullivan et al. ......... 273/235 R |
| 5,055,438 A | 10/1991 | Canich .................. 502/117 |
| 5,155,157 A | 10/1992 | Statz et al. ............. 524/423 |
| 5,160,674 A | 11/1992 | Colton et al. |
| 5,218,057 A | 6/1993 | Kurkov et al. .......... 525/369 |
| 5,253,871 A | 10/1993 | Viollaz ................... 273/228 |
| 5,324,783 A | 6/1994 | Sullivan ................. 525/196 |
| 5,324,800 A | 6/1994 | Welborn, Jr. et al. .... 526/160 |
| 5,508,351 A | 4/1996 | Horiuichi et al. ........ 525/196 |
| 5,554,698 A | 9/1996 | Wang et al. ............. 525/330.2 |
| 5,730,664 A * | 3/1998 | Asakura |
| 5,869,578 A | 2/1999 | Rajagopalan ............ 525/330.2 |
| 6,121,384 A * | 9/2000 | Rajagopalan |
| 6,255,361 B1 * | 7/2001 | Rajagopalan |
| 6,261,193 B1 * | 7/2001 | Sullivan |
| 6,270,428 B1 * | 8/2001 | Kuttappa |

FOREIGN PATENT DOCUMENTS

| | | |
|---|---|---|
| CA | 963380 | 2/1975 |
| EP | 0104316 B1 | 11/1987 |
| WO | WO93/06137 | 4/1993 |
| WO | WO96/23009 | 8/1996 |
| WO | 97/19114 * | 5/1997 |

OTHER PUBLICATIONS

*Block and Graft Copolymers*, R. Ceresa, Butterworths, London (1962).

* cited by examiner

Primary Examiner—David J. Buttner
(74) Attorney, Agent, or Firm—Swidler Berlin Shereff Friedman, LLP

(57) ABSTRACT

A golf ball comprising a cover, a core, and optionally, an intermediate layer positioned between the cover and the core, wherein, at least one of the core, and the optional intermediate layer comprises at least one layer comprising a saponified polymer prepared by a process comprising the following steps. Forming a polymer comprising: (I) a first monomeric component comprising a first olefinic monomer having from 2 to 8 carbon atoms; (2) a second monomeric component comprising an unsaturated carboxylic acid based acrylate class ester having from 4 to 22 carbon atoms; and (3) an optional third monomeric component comprising at least one monomer selected from the group consisting of carbon monoxide, sulfur dioxide, an anhydride monomer, an unsaturated monocarboxylic acid, a second olefin having from 2 to 8 carbon atoms, and a vinyl ester or a vinyl ether of an alkyl acid having from 4 to 21 carbon atoms.

40 Claims, No Drawings

COMPOSITIONS USEFUL FOR FORMING THE LAYERS OF A GOLF BALL AND METHOD OF MAKING SAME

This application is a continuation-in-part of U.S. patent application Ser. No. 09/215,370, filed on Dec. 18, 1998 now U.S. Pat. No. 6,121,384 which is a divisional of U.S. patent application Ser. No. 08/978,510, filed Nov. 25, 1997, now U.S. Pat. No. 5,869,578, which is a continuation of U.S. patent application Ser. No. 08/560,763, filed Nov. 21, 1995, now abandoned. Each of these applications is incorporated by reference herein in its entirety.

TECHNICAL FIELD

The present invention relates to golf balls and, in particular, to golf balls having at least one layer comprising at least one saponified polymeric material. The layer may be located in any of the core or the optional mantle layer located between the cover and the core of a golf ball.

BACKGROUND OF THE INVENTION

Three-piece, wound golf balls with balata covers are preferred by most expert golfers. These balls provide a combination of distance, high spin rate and control that is not available with other types of golf balls. However, balata is easily damaged in normal play and, thus, lacks the durability required by the average golfer. In contrast, amateur golfers typically prefer a solid, two-piece ball with an ionomer cover, which provides a combination of distance and durability. Because of the hard ionomer cover, these balls are almost impossible to cut, but also have a very hard "feel", which many golfers find unacceptable, and a lower spin rate, making these balls more difficult to draw or fade. The differences in the spin rate can be attributed to the differences in the composition and construction of both the cover and the core.

Golf balls having a non-wound intermediate layer between the cover and the core comprising an ionomer have been disclosed. For example, U.S. Pat. No. 5,253,871 to Viollaz discloses the use of at least 10 percent of a block copoly(amide-ether) elastomer, optionally blended with an ionomer, for use as the middle layer of a three-layer golf ball.

The USGA has promulgated a rule that no golf ball shall have an initial velocity that exceeds 255 feet per second, i.e., 250 feet per second with a 2% tolerance. Golf balls with covers made from ionomer resins with a low flexural modulus are woefully below this maximum and, as should be appreciated, all golf ball manufacturers strive to come as close as possible to this limit.

Consequently, a need exists for a golf ball composition that provides spin rates and a feel more closely approximating those of balata balls, while also providing the distance of an ionomer two-piece ball. This invention teaches a new route to produce polymers with ionomeric character by selectively carrying out hydrolysis or saponification on copolymers to produce core and intermediate layer compositions useful in golf balls Saponification or hydrolysis of alkyl acrylate units in a crosslinkable polymer chain is disclosed by Gross in U.S. Pat. No. 3,926,891. In U.S. Pat. No. 3,970,626, Hurst discloses heating a mixture of an alkali metal hydroxide, a thermoplastic ethylene-alkyl acrylate copolymer and water to saponify the acrylate units and form an aqueous emulsion. A different approach to saponification or hydrolysis of an ethylene-alkyl acrylate copolymer is disclosed by Kurkov in U.S. Pat. No. 5,218,057, in which the copolymer is mixed with an aqueous solution of an inorganic alkali metal base at a temperature sufficient for saponification to take place and at which the copolymer undergoes a phase change.

All of the prior saponification methods discussed above require that the polymer component be in contact with water, either by conducting the reaction in an aqueous medium or by adding an aqueous solution to the polymer. However, nonaqueous inorganic alkali metal base solutions, e.g., containing an alcohol or polyethylene glycol solvent, are disclosed by U.S. Pat. No. 5,554,698 to Wang et al., although aqueous solutions are disclosed to be preferred.

McClain, in U.S. Pat. No. 4,638,034, discloses a process whereby ethylene-acrylic acid copolymers or their ionomers are prepared from ethylene-alkyl acrylate copolymers by saponifying the latter in the melt with metal hydroxides to form an ionomer and a by-product, i.e., alkanol, then optionally acidifying the ionomer to form the free acid copolymer.

The processes disclosed by the Kurkov, McClain and Wang references, in particular, are incapable of providing optimal product quality since blending and saponifying in a single operation as taught by the subject references leads to rapid saponification, with a concurrent rapid increase in melt viscosity. Due to this rapid increase in melt viscosity, the resultant mixture is non-uniform and therefore the material properties of products made from this material are not consistent throughout the product. U.S. Pat. No. 5,869,578 to Rajagopalan, a patent that issued from one of the parent applications of the present invention, overcame the above deficiencies.

Saponified polymers of the present invention differ from prior art ionomers, inter alia, in that any pendant groups that are not modified by the saponification process are ester groups in contrast to the pendant carboxylic acid groups that remain after neutralization in prior art ionomers. The new composition can contain binary, ternary, or multi-component blends of metal cations used to neutralize the polymer. Such blends may be further combined with other polymers, such as SURLYN®, IOTEK® and IMAC® ionomers, to produce golf balls with desirable properties. The golf ball composition can be used for both solid and wound construction balls.

SUMMARY OF THE INVENTION

The invention relates to a golf ball comprising a cover, a core, and optionally, an intermediate layer positioned between the cover and the core, where at least one of the core, and the optional intermediate layer comprises at least one layer comprising a saponified polymer, and to a method of making such golf balls. The saponified polymer of the present invention is prepared by a process comprising the steps of forming a polymer comprising a first monomeric component comprising a first olefinic monomer having from 2 to 8 carbon atoms, a second monomeric component comprising an unsaturated carboxylic acid based acrylate class ester having from 4 to 22 carbon atoms; and, optionally, a third monomeric component comprising at least one monomer selected from the group consisting of carbon monoxide, sulfur dioxide, an anhydride monomer, an unsaturated monocarboxylic acid, a second olefin having from 2 to 8 carbon atoms, and a vinyl ester or a vinyl ether of an alkyl acid having from 4 to 21 carbon atoms. A sufficient amount of heat is applied to the polymer to convert the polymer to a substantially molten state, and a mixture is formed by adding an inorganic metal base to the molten polymer, such that the viscosity of the mixture remains substantially unchanged from the viscosity of the molten polymer, where a sufficient amount of the inorganic metal base is added to the molten polymer in forming the mixture to obtain a degree of saponification of the polymer ranging between about 1 and 50 percent. Little or no saponification occurs during this initial mixing step. The mixture is then saponified to produce a saponified polymer comprising a polymer salt adapted for forming improved golf ball layers. Preferably, a layer of a golf ball of the present invention has a flexural modulus of at least 500 to about 300,000 psi and a specific gravity of at least 0.7.

A golf ball comprising the present invention has an Atti compression of at least 50 and a coefficient of restitution of at least 0.7. Preferably, the Atti compression of the golf ball is at least 60 to about 100.

Golf balls in accordance with the invention preferably have a cover and a core diameter of at least 0.5 to about 1.63 inches. Where the golf ball of the present invention further comprises at least one optional mantle or intermediate layer, the mantle or intermediate layer has a thickness of at least 0.02 inches. Golf balls of the present invention have an intermediate layer hardness of at least 20 Shore D and a flexural modulus of about 500 to about 100,000 psi and a core layer hardness of at least 40 Shore A to about 70 Shore D and a flexural modulus of at least 500 to about 150,000 psi. Any of the core or the center, or the at least one optional mantle or intermediate layer may comprise a density adjusting filler material to increase or decrease the density so that a ball's trajectory can be altered as necessary. The density adjusting filler material may be a metallic powder or a metallic oxide derivative. Preferably, the metallic powder is either titanium, tungsten or copper powder and the metallic oxide derivative is an oxide derivative of titanium, tungsten, copper or tin.

In addition, any of the core or the center, or the at least one optional mantle or intermediate layer may have a foamed structure. The at least one optional mantle or intermediate layer may further comprise a wound tensioned elastomeric material, wherein the tensioned elastomeric material further comprises natural or synthetic elastomers or blends thereof. Preferably, the synthetic elastomer is LYCRA. The center may be solid, fluid-filled or hollow.

Preferably, the saponified polymer of this invention has a Shore D hardness of at least 15, as measured by ASTM method D-2240, a flexural modulus, as measured by ASTM method D-790, of at least 500 psi, preferably about 1000 psi to about 100,000 psi, a specific gravity of at least about 0.7, preferably at least 0.75 to about 1, a dynamic shear storage modulus (G') at 23° C., as described in ASTM D 4092-90, ASTM D 5279-93, and ASTM D 4065-94, of at least about $10^4$ dynes/cm$^2$, preferably about $10^6$ to about $10^{10}$ dynes/cm$^2$, and most preferably from about $10^6$ to about $10^9$ dynes/cm$^2$, and a loss tangent (tan δ) of no more than about 1, preferably, no more than about 0.1, and most preferably from about 0.001 to about 0.01 at 23° C.

Preferably, the metal base utilized in making the saponified polymer of the present invention comprises at least one metallic cation selected from the group consisting of lithium, sodium, potassium, magnesium, calcium, barium, lead, tin, zinc and aluminum.

Preferably, the first monomeric component is of general formula:

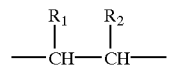

where $R_1$ is hydrogen or an alkyl group, and $R_2$ is hydrogen, lower alkyl, such as $C_1$–$C_5$, carbocyclic or aromatic; the second monomeric component is an unsaturated acrylate class ester having the general formula:

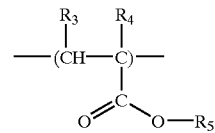

wherein: $R_3$ is hydrogen or an alkyl group; $R_4$ is hydrogen, lower alkyl, such as $C_1$–$C_5$, carbocyclic or aromatic; and $R_5$ is selected from the group consisting of $C_nH_{2n+1}$, for n=1 to 18 and phenyl, in which from 0 to 5 H within $R_5$ can be replaced by substituents selected from the group consisting of COOH, $SO_3H$, $NH_2$, succinic anhydride and their salts or $R_5$ can be replaced by substituents selected from the group consisting of F, Cl, Br, I, OH, SH, epoxy, silicone, lower alkyl esters, lower alkyl ethers and aromatic rings, wherein optionally $R_4$ and $R_5$ can be combined to form a bicyclic ring; and the third monomeric component is at least one of the monomers selected from the group consisting of:

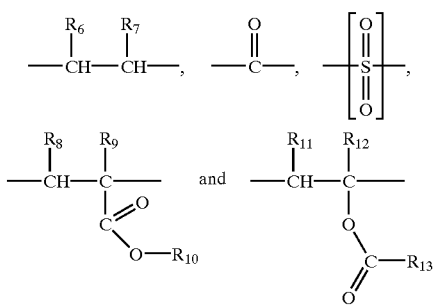

wherein: $R_6$ is hydrogen, lower alkyl, such as $C_1$–$C_5$, carbocyclic or aromatic; $R_7$ is hydrogen, lower alkyl, such as $C_1$–$C_5$, carbocyclic or aromatic; $R_8$ is hydrogen, lower alkyl, such as $C_1$–$C_5$, carbocyclic or aromatic; $R_9$ is hydrogen, lower alkyl, such as $C_1$–$C_5$; $R_{10}$ is hydrogen, or is selected from the group consisting of $CnH_2n+_1$ for n=1 to 18 and phenyl, in which from 0 to 5 H within $R_{10}$ can be replaced by substituents selected from the group consisting of COOH, $SO_3H$, $NH_2$ and their salts, or $R_{10}$ can be replaced by substituents selected from the group consisting of F, Cl, Br, I, OH, SH, silicon, lower alkyl esters, lower alkyl ethers and aromatic rings, wherein optionally $R_9$ and $R_{10}$ can be combined to form a bicyclic ring; $R_{11}$ is hydrogen, lower alkyl, such as $C_1$–$C_5$, carbocyclic or aromatic; $R_{12}$ is hydrogen or lower alkyl, such as $C_1$–$C_5$; and $R_{13}$ is hydrogen, or is selected from the group consisting of $C_RH_{2n+1}$, for n=1 to 18 and phenyl, in which from 0 to 5 H within $R_{13}$ can be replaced by substituents selected from the group consisting of COOH, $SO_3H$, $NH_2$ and their salts, or $R_{13}$ can be replaced by substituents selected from the group consisting of F, Cl, Br, I, OH, SH, silicon, lower alkyl esters, lower alkyl ethers and aromatic rings, wherein optionally $R_{12}$ and $R_{13}$ can be combined to form a bicyclic ring.

In addition, the polymer may be grafted by addition of a grafting agent.

The saponified polymer may also be blended with at least one additional thermoplastic ionomer, which is preferably selected from the group consisting of ethylene methacrylic acid ionomers, ethylene acrylic acid ionomers, terpolymer ionomers comprising ethylene and methacrylic acid monomeric units, and terpolymer ionomers comprising ethylene and acrylic acid monomeric units.

The saponified polymer may also be blended with at least one non-ionic thermoplastic, which is preferably selected from the group consisting of poly(butyl acrylate), poly(2-ethylbutyl acrylate), poly(heptyl acrylate), poly(silanes), block poly(ether-ester) copolymers, styrene-butadiene-styrene block copolymers, styrene-(ethylene-propylene)-styrene block copolymers, styrene-(ethylene-butylene)-styrene block copolymers, styrene-butadiene-styrene block copolymers comprising maleic anhydride functionality, styrene-(ethylene-propylene)-styrene block copolymers comprising maleic anhydride functionality, styrene-(ethylene-butylene)-styrene block copolymers comprising maleic anhydride functionality, styrene-butadiene-styrene block copolymers comprising sulfonic functionality, styrene-(ethylene-propylene)-styrene block copolymers comprising sulfonic functionality, styrene-(ethylene-butylene)-styrene block copolymers comprising sulfonic functionality, ethylene-acrylate copolymers, ethylene methacrylate copolymers, ethylene-octene copolymers made from metallocene catalysts, ethylene-alpha olefin copolymers and terpolymers made from metallocene catalysts as well as from non-metallocene single-site catalysts, block poly(urethane-ester) copolymers, block poly(urethane-ether) copolymers, block poly(urethane-caprolactone) copolymers, polycaprolactones, polyesters, such as poly(ethylene terephthalate), poly(trimethylene terephthalate) and poly(butylene terephthalate), polycarbonates, ethylene-propylene-(diene monomer) terpolymers, sulfonated derivatives of ethylene-propylene-(diene monomer) terpolymers, and carboxylated derivatives of ethylene-propylene-(diene monomer) terpolymers and blends thereof.

Preferably, the polymer and the metal base are mixed by first introducing the polymer into an inlet zone of an extruder comprising an inlet and at least one addition zone; melting and mixing the polymer in the inlet zone; passing the molten polymer through an addition zone within the extruder. A mixture is then formed at a first temperature above the melting temperature of the polymer and below a second temperature at which saponification takes place by adding a solution consisting essentially of at least one metal base and at least one nonaqueous solvent into the molten polymer as it passes through the addition zone such that the viscosity of the mixture remains substantially unchanged from the viscosity of the molten polymer. The mixture is then saponified at the second temperature to produce a polymer salt adapted for use in forming a golf ball layer, wherein a sufficient amount of the inorganic metal base is added to the molten polymer in forming the mixture to obtain a degree of saponification of the polymer ranging between about 1 and 50 percent. Preferably, the extruder has at least two addition zones connected in series, where a portion of the metal base solution is added in each addition zone.

DETAILED DESCRIPTION OF THE INVENTION

As used herein, the terms "saponified polymer" and "saponified ionomer" refer to a polymer comprising at least one olefin and at least one unsaturated monomer that contains a pendant ester group, where at least some of the pendant ester groups have been saponified or hydrolyzed.

Saponified polymers differ from prior art ionomers, inter alia, in that any pendant groups that are not modified by the saponification process are ester groups in contrast to the pendant carboxylic acid groups that remain after neutralization in prior art ionomers.

As used herein, with regard to a polymer blend, the term "compatible" refers to a blend of two or more polymers, having useful golf ball properties, that is homogeneous on a macroscopic scale. Compatible blends may be miscible, i.e., homogeneous on a microscopic scale, or at least partially immiscible, i.e., heterogeneous on a microscopic scale, but homogeneous on a macroscopic scale. The term "incompatible" refers to a mixture of at least two polymers that is heterogeneous on both a microscopic scale and a macroscopic scale, such that useful golf ball properties, such as durability, are lacking.

As used herein, the term "layer" includes any generally spherical portion of a golf ball or golf ball core, center (hollow, solid, fluid filled type), or intermediate layer, including one-piece cores and one-piece balls. An "intermediate layer" (also known as inner layer or mantle layer) is defined herein as a portion of the golf ball that occupies a volume between the cover and the core. Such an intermediate layer may be distinguished from a cover or a core by some difference in the materials properties comprising the layers. Moreover, a "core" as these terms are used herein may comprise a single layer or a plurality of layers. An intermediate layer may be used, if desired, with a multilayer cover or a multilayer core, or with both a multilayer cover and a multilayer core. Therefore, an intermediate layer is also sometimes referred to in the art as an inner cover layer, as an outer core layer or as a mantle layer or intermediate layer.

As used herein, the term "core" means the innermost portion of a golf ball, and may include one or more layers. When more than one layer is contemplated, the core includes a center and at least one mantle layer disposed thereabout. At least a portion of the core, typically the center, is solid or fluid. The core may also include one or more wound layers including at least one tensioned elastomeric material wound about the center. Preferably, the tensioned elastomeric material is a natural or synthetic elastomer or blends thereof. Preferably, the synthetic elastomer is LYCRA.

As used herein, the term "Atti compression" is defined as the deflection of an object or material relative to the deflection of a calibrated spring, as measured with an Atti Compression Gauge, that is commercially available from Atti Engineering Corp. of Union City, N.J. Atti compression is typically used to measure the compression of a golf ball and/or a golf ball core.

As used herein, the term "coefficient of restitution" (COR) is calculated by dividing the rebound velocity of the golf ball by the incoming velocity when a golf ball is shot out of an air cannon. The COR testing is conducted over a range of incoming velocities and determined at an inbound velocity of 125 ft/s.

As used herein, the term "foamed" encompasses "conventional foamed" materials that have cells with an average diameter of greater than 100 µm and "microcellular" type materials that have closed cell sizes on the order of 2 to 25 µm. Examples of conventional foamed materials include those described in U.S. Pat. No. 4,274,637. Examples of microcellular closed cell foams include those foams disclosed in U.S. Pat. No. 4.473,665 and U.S. Pat. No. 5,160,674.

As used herein, the term "fluid" means a gas, liquid, gel, paste, or the like, or a combination thereof.

The term "about," as used herein in connection with one or more numbers or numerical ranges, should be understood to refer to all such numbers, including all numbers in a range.

The present invention is directed to improved golf balls, having a cover, a core, and, optionally, an intermediate layer between the cover and the core, and to a method of making such golf balls. Golf balls in accordance with the invention have at least one layer in at least one of the core and the optional intermediate layer, where the layer comprises at least one polymer selected from the group consisting of polymers of formula I:

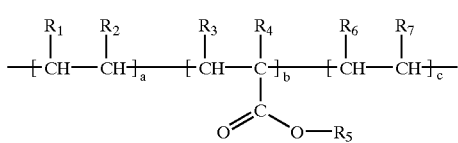
(I)

wherein:

$R_1$ is hydrogen, alkyl such as methyl, ethyl, and branched or straight chain propyl, butyl, pentyl, hexyl, heptyl, and octyl;

$R_2$ is hydrogen, lower alkyl, such as $C_1$–$C_5$ carbocyclic or aromatic;

$R_3$ is hydrogen, alkyl such as methyl, ethyl and branched or straight chain propyl, butyl, pentyl, hexyl, heptyl and octyl;

$R_4$ is hydrogen, lower alkyl, such as $C_1$–$C_5$, carbocyclic or aromatic;

$R_5$ is selected from the group consisting of $C_nH_{2n-1}$, for n=1 to 18 (which includes, for example, $CH_3$, $C_2H_5$, $C_3H_7$, $C_4H_9$, $C_5H_{11}$, $C_6H_{13}$, $C_7H_{15}$, $C_9H_{19}$, $C_{10}H_{21}$) and phenyl, in which from 0 to 5 H within $R_5$ can be replaced by substituents selected from the group consisting of COOH, $SO_3H$, $NH_2$, succinic anhydride and their salts, or $R_5$ can be replaced by substituents selected from the group consisting of F, Cl, Br, I, OH, SH, epoxy, silicone, lower alkyl esters, lower alkyl ethers, and aromatic rings, wherein optionally $R_4$ and $R_5$ can be combined to form a bicyclic ring;

$R_6$ is hydrogen, lower alkyl, such as $C_1$–$C_5$, carbocyclic or aromatic;

$R_7$ is hydrogen, lower alkyl, such as $C_1$–$C_5$, carbocyclic or aromatic; and wherein a, b and c are the relative percentages of each co-monomer; polymers of formula II,

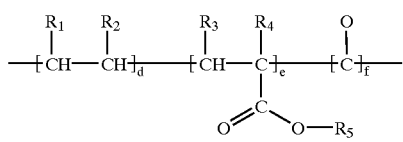
(II)

wherein:

$R_1$, $R_2$, $R_3$, $R_4$, and $R_5$ are as defined above; and wherein d, e and f are the relative percentages of each co-monomer in any of the cover, core, and an optional intermediate layer of the golf ball; polymers of formula III,

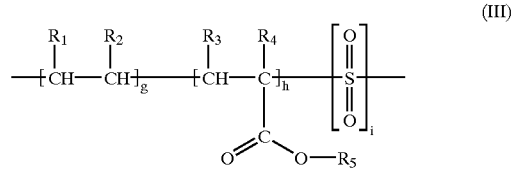
(III)

wherein:

$R_1$, $R_2$, $R_3$, $R_4$, and $R_5$ are as defined above; and wherein g, h and i are the relative percentages of each co-monomer; polymers of formula IV,

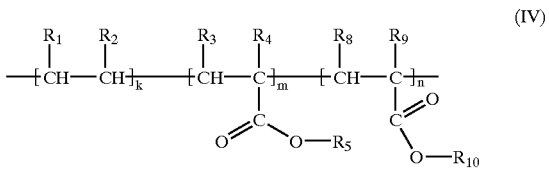
(IV)

wherein:

$R_1$, $R_2$, $R_3$, $R_4$, and $R_5$ are as defined above; $R_8$ is hydrogen, lower alkyl, such as $C_1$–$C_5$, carbocyclic or aromatic;

$R_9$ is hydrogen or lower alkyl, such as $C_1$–$C_5$; and $R_{10}$ is hydrogen, or is selected from the group consisting of $C_nH_{2n+1}$, for n=1 to 18 and phenyl, in which from 0 to 5 H within $R_{10}$ can be replaced by substituents selected from the group consisting of COOH, $SO_3H$, $NH_2$, succinic anhydride and their salts, or $R_{10}$ can be replaced by substituents selected from the group consisting of F, Cl, Br, I, OH, SH, epoxy, silicon, lower alkyl esters, lower alkyl ethers and aromatic rings, wherein optionally $R_9$ and $R_{10}$ can be combined to form a bicyclic ring; and wherein k, m and n are the relative percentages of each co-monomer; and polymers of formula V,

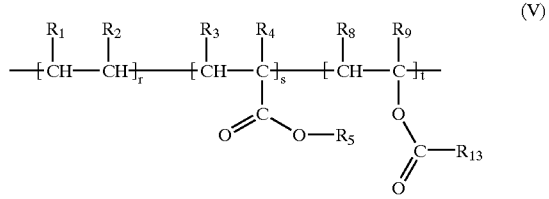
(V)

wherein:

$R_1$ to $R_5$ are as defined above; $R_{11}$ is hydrogen, lower alkyl, such as $C_1$–$C_5$, carbocyclic or aromatic;

$R_{12}$ is hydrogen or lower alkyl, such as $C_1$–$C_5$; and $R_{13}$ is hydrogen or is selected from the group consisting of $C_nH_{2n+1}$ for n=1 to 18 and phenyl, in which from 0 to 5 H within $R_{13}$ can be replaced by substituents selected from the group consisting of COOH, $SO_3H$, $NH_2$, succinic anhydride and their salts, or $R_{13}$ can be replaced by substituents selected from the group consisting of F, Cl, Br, I, OH, SH, epoxy, silicone, lower alkyl esters, lower alkyl ethers and aromatic rings, wherein optionally $R_{12}$ and $R_{13}$ can be combined to form a bicyclic ring; and wherein r, s and t are the relative percentages of each co-monomer.

The subject copolymers can be random, block or alternating polymers and may be made by blending two, three, four, five or more different monomers according to processes well known to one of ordinary skill in the art. Additionally, the subject polymers may be isotactic, syndiotactic or atactic, or any combination of these forms of types of polymers. The pendant groups creating the isotactic, syndiotactic or atactic polymers can be chosen to determine the interactions between the different polymer chains making up the resin to control the final properties of the resins used in golf balls. Aromatic and cyclic olefins can be used in the present invention as well as such specific groups as methyl and phenyl.

As used herein, the phrase straight chain or branched chain alkyl groups means any substituted or unsubstituted acyclic carbon-containing compounds, including alkanes, alkenes and alkynes. Examples of alkyl groups include lower alkyl, for example, methyl, ethyl, n-propyl, iso-propyl, n-butyl, iso-butyl or tert-butyl; upper alkyl, for example, octyl, nonyl, decyl, and the like; and lower alkylene, for example, ethylene, propylene, propyldiene, butylene, butyldiene, pentene, hexene, heptene, octene, norbornene, nonene, decene and the like.

In addition, such alkyl groups may also contain various substituents in which one or more hydrogen atoms is replaced by a functional group. Functional groups include, but are not limited to, hydroxyl, amino, carboxyl, sulfonic amide, ester, ether, phosphates, thiol, nitro, silane, succinic anhydride, epoxy and halogen (fluorine, chlorine, bromine and iodine), to mention a few.

As used herein, substituted and unsubstituted carbocyclic groups include cyclic carbon-containing compounds, including not limited to cyclopentyl, cyclohexyl, cycloheptyl, adamantyl, and the like, and may further comprise a heteroatom. Such cyclic groups may also contain various substituents in which one or more hydrogen atoms is replaced by a functional group. Such functional groups include those described above, and lower alkyl groups having from 1 to 28 carbon atoms.

$R_1$ and $R_2$ can represent any combination of alkyl, carbocyclic or aromatic groups, for example, 1-cyclohexylpropyl, benzyl cyclohexylmethyl, 2-cyclohexylpropyl, 2,2-methylcyclohexylpropyl, 2,2-methylphenylpropyl, 2,2-methylphenylbutyl. Aromatic groups include, for example, phenyl, naphthyl, anisyl, toluyl, xylenyl and the like. According to the present invention, aromatic also includes heteroaryl groups, e.g., pyrimidine or thiophene. These materials may also be substituted with any number of a variety of functional groups. In addition to the functional groups described above in connection with substituted alkyl groups and carbocyclic groups, functional groups on the aromatic compounds can include nitro groups.

The comonomers described herein can be combined in a variety of ways to provide a final copolymer with a variety of characteristics. The letters a, d, g, k, and r represent numbers which can range, independently, from about 1 to about 99 percent, or preferably from about 10 to about 95 percent, more preferably from about 10 to about 70 percent, and most preferred, from about 10 to about 50 percent. In addition, b, e, h, m and s can independently range from about 99 to about 1 percent, or preferably from about 90 to about 5 percent, or more preferably from about 90 to about 30 percent, or most preferred from about 90 to about 50 percent, and c, f, i, n and t can range, independently, from about 0 to about 49 percent.

In addition, the copolymers useful in the invention can be grafted with various substituent groups in a post-polymerization reaction to provide improved golf balls. For example, graft polymers can be produced such that the graft segment making up the linkage between polymer chains comprises an anhydride, wherein an "anhydride" is a compound having the formula:

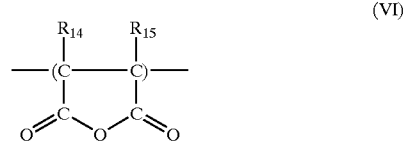

(VI)

wherein:

$R_{14}$ and $R_{15}$ are the same or different and are chosen from among hydrogen, linear or branched chain alkyl and substituted or unsubstituted carboxylic groups. Alternately, however, other grafting agents containing double or triple bonds can be used as grafting agents. Examples of these materials include, but are not limited to, acrylates, styrene and butadiene.

Grafting the polymer molecules of the present invention can be accomplished according to any technique known in the art. See, e.g., Block and Graft Copolymers, by R. Ceresa, pub. by Butterworths, London, U.S. (1962), incorporated by reference herein. It is preferred that any grafting of the polymers of the present invention be accomplished by adding from about 1 to about 50%, or preferably from about 1 to about 25% and most preferably from about 1 to about 15% of a grafting agent, such as an anhydride according to Formula VI above. The grafting agents can be added either as a solid or a non-aqueous liquid, to a polymer according to the present invention. Such post reaction grafting can make the final grafted polymer more flexible.

In summary, polymers useful in the invention comprise: (1) a first monomeric component comprising an olefinic monomer having from 2 to 8 carbon atoms; (2) a second monomeric component comprising an unsaturated carboxylic acid based acrylate class ester having from 4 to 22 carbon atoms; and (3) an optional third monomeric component comprising at least one monomer selected from the group consisting of carbon monoxide, sulfur dioxide, an anhydride monomer, an unsaturated monocarboxylic acid, an olefin having from 2 to 8 carbon atoms and a vinyl ester or a vinyl ether of an alkyl acid having from 4 to 21 carbon atoms.

In the saponification process used in forming the polymers useful in the invention, the metal base or metal salt is added in the form of a solid or a solution. Preferably, the metal base is in the form of a solid, such as a powder or a pellet. Powdered bases used in the invention preferably have an average powder particle diameter of from about 1 to about 500 microns. More preferably, such powders have an average particle diameter of about 10 to about 100 microns. In the case of pellets, substantially any commercially available pellet particle size can be used.

Alternately, the metal base can be added in the form of a solution. Preferably, the solution is non-aqueous, so that difficulties arising from incomplete removal of water during subsequent processing and use are avoided. Such non-aqueous solutions typically comprise solvents such as alcohol, acetic acid and acetic anhydride, although other solvents may, of course, be used. Preferably, the metal base comprises at least one metallic cation selected from the group consisting of lithium, sodium, potassium, magnesium, calcium, barium, lead, tin, zinc and aluminum, and at least one anion selected from the group consisting of hydroxide, alkoxide, acetate, carbonate, bicarbonate, oxide, formate, and nitrate.

The process for saponifying or hydrolyzing the polymers useful in the invention comprises introducing the polymer into an extruder inlet zone, and melting and mixing the polymer in the inlet zone; passing the molten polymer through an addition zone within the extruder downstream from the inlet zone; and adding, under saponification conditions as defined above, a metal base into the molten polymer as it passes through the addition zone until the polymer is at least partially saponified as indicated by, for example, its melt index or by titrating versus an acid.

This process is preferably performed using a twin screw extruder, which comprises melting, addition, and mixing zone means. The process can further be accomplished using a master batch comprising a concentrated amount of metal base in a polymer, with the same or different composition as the polymer introduced into the inlet zone, wherein the master batch is added from a side-stream extruder. The side-stream extruder can be a twin screw extruder comprising melting, addition, and mixing zone means.

In yet another embodiment, the continuous process of this invention for saponifying or hydrolyzing the polymer of this invention comprises introducing the polymer into an inlet zone of an extruder, and melting and mixing the polymer in the inlet zone; passing the molten polymer through at least two addition zones connected in series; and adding, under saponification conditions, a portion of a metal base into the molten polymer as it passes through each addition zone until the polymer is at least partially saponified.

This process can be accomplished using a twin screw extruder wherein the twin screw extruder comprises melting, addition, and mixing zone means. The process can further be accomplished using a single or a plurality of master batches comprising a concentrated amount of metal base in a polymer, with the same or different composition as the polymer introduced into the inlet zone and with the same or different amount of metal base as the other master batches, wherein the master batch is added from a side-stream extruder. The process can be accomplished with a single or with multiple side-stream extruders which are twin screw extruders comprising melting, addition, and mixing zone means.

In another embodiment of the invention the hydrolyzed polymers of the present invention are combined with another polymer or ionomer, according to methods well known in the art, and the resultant material is used in forming golf ball layers. In particular, the polymers of the present invention may be combined with any other polymer that is or can be used in golf ball layers.

A polymer with ionomeric character produced by this invention can be blended with the other similar polymers produced by this invention, but having a different metal base cation or distribution of cationic species than used that to make the first polymer, to yield a blend with desirable golf ball properties.

Alternatively, two different polymers with ionomeric character with the same metal base cation produced by the process of this invention can be blended to yield a blend with desirable golf ball properties. For example, the two polymers can differ in their degree of hydrolysis, degree of subsequent acidification, molecular weight, molecular weight distribution, tacticity, blockiness, etc.

In yet another embodiment, two different polymers with ionimeric character, each differing by the metal base cation or distribution of cationic species used to make the two polymers can be blended to yield a blend with desirable golf ball properties.

In a further embodiment, the polymers of the subject invention are combined with thermoplastic ionomers such as ethylene methacrylic acid ionomers, and ethylene acrylic acid ionomers, and their terpolymers, currently sold commercially under the trade names SURLYN® and IOTEK® by DuPont and Exxon respectively. These and other polymers and ionomers are described in U.S. Pat. No. 5,155,157 and Canadian Patent 963,380.

In a further embodiment of the present invention the polymers of the subject invention are combined with other non-ionic thermoplastics. Polymers of this type which can be used in conjunction with the polymers of the claimed invention in golf ball layers include: poly(ethylethylene), poly(heptylethylene), poly(hexyldecylethylene), poly(isopentylethylene), poly(1,1-dimethyltrimethylene), poly(1,1,2-trimethyltrimethylene), poly(butyl acrylate), poly(4-cyanobutyl acrylate), poly(2-ethylbutyl acrylate), poly(heptyl acrylate), poly(2-methylbutyl acrylate), poly(3-methylbutyl acrylate), poly(N-octadecylacrylamide), poly(octadecyl methacrylate), poly(butoxyethylene), poly(methoxyethylene), poly(pentyloxyethylene), poly(1,1-dichloroethylene), poly(cyclopentylacetoxyethylene), poly(4-[(2-butoxyethoxy)methyl]styrene), poly(4-dodecylstyrene), poly(4-tetradecylstyrene), poly(phenetylmethylethylene), poly [oxy(allyloxymethyl)ethylene], poly[oxy(ethoxymethyl)ethylene], poly(oxyethylethylene), poly(oxytetramethylene), poly(oxytrimethylene), poly(oxycarbonylpentamethylene), poly(oxy-2,2,3,3,4,4-hexafluoropentamethyleneoxyadipoyl), poly(silanes), poly(silazanes), polyesters, such as poly(ethylene terephthalate), poly(trimethylene terephthalate) and poly(butylene terephthalate) and polycarbonates, as well as the classes of polymers to which they belong.

Other polymers may also be used in golf ball layers according to the present invention. In particular, any of the polymers that are disclosed in U.S. Pat. Nos. 2,924,593, 5,055,438 and 5,324,800, the disclosure of which is expressly incorporated herein, may be used in forming compositions for golf ball layers according to the subject invention.

More preferably, the other polymers which can be used in conjunction with the polymers of the claimed invention in golf ball layers include: block poly(ether-ester) copolymers, such as HYTREL® available from DuPont, block poly(ether-amide) copolymers, such as PEBAX® available from Elf Atochem, styrene-butadiene-styrene block copolymers, such as the KRATON D® grades available from Shell Chemical, styrene-(ethylene-propylene)-styrene or styrene-(ethylene-butylene)-styrene block copolymers, such as the KRATON G® series from Shell Chemical, either of the KRATON® with maleic anhydride or sulfonic graft or functionality, such as the KRATON FD® or KRATON FG®) series available from Shell Chemical, olefinic copolymers, such as the ethylene-acrylate or ethylene methacrylate series available from Quantum, ethylene-octene copolymers made from metallocene catalysts, such as the AFFINITY® or ENGAGE® series available from Dow Chemical and DuPont-Dow Elastomers, ethylene-octene copolymers made from non-metallocene catalysts, such as single-site catalysts, ethylene-alpha olefin copolymers and terpolymers made from metallocene catalysts, such as the EXACT® series available from Exxon Chemical, ethylene-alpha olefin copolymers and terpolymers made from non-metallocene single-site catalysts, block poly(urethane-ester) or block poly(urethane-ether) or block poly(urethane-caprolactone), such as the ESTANE series available from BF Goodrich, polyethylene glycol, such as CARBOWAX available from Union Carbide, polycaprolactone, polycaprolactam, polyesters, such as EKTAR available from Eastman, ethylene-propylene-(diene monomer) terpolymers and their sulfonated or carboxylated derivatives, and SANTOPRENE from Monsanto.

The polymer blends of this invention can be prepared with or without the addition of a compatibilizer and with varying molecular architecture of blend components, such as varying molecular weight, tacticity, degrees of blockiness, etc., as is well known to those knowledgeable in the art of blending polymers.

The amounts of polymers used in the subject invention can vary from 1 to 99 percent of the hydrolyzed polymers of the present invention to 99 to 1 percent of other polymers and/or ionomers which can be used in golf ball layers. More preferred ratios of 95 to 5 percent of the hydrolyzed polymers of the subject invention with 5 to 95 of one or more other polymer(s). Most preferred is from about 95 to about 10 of the subject hydrolyzed polymers and from about 5 to about 90 of other polymer or ionomer.

Additional components which can be added to the golf ball compositions of the present invention include U.V. stabilizers, light stabilizers, optical brighteners, fluorescent pigments, coloring agents, such as pigments, density adjusting fillers, such as zinc oxide, barium sulphate and tungsten carbide and metallic powders, such as titanium, tungsten and copper powders, foaming agents and lubricants.

The polymers of the invention can be used to form any type of golf ball, including one piece balls, two piece balls, and balls comprising a cover, a core, and an intermediate layer or mantle layer situated between the cover and the core, and may be used in any portion of the golf ball, such as a core, one or more core layers, a cover, one or more cover layers, and one or more intermediate layers between the cover and the core. In particular, two-piece and three-piece golf balls comprising one or more layers surrounding a core are within the scope of the present invention, as are wound golf balls, in which a liquid, semi-solid or solid core is surrounded by an elastic synthetic material. The term "solid cores" as used herein refers not only to one piece cores also to those cores having a separate solid layer beneath the cover and above the core as disclosed in U.S. Pat. No. 4,431,193 (the disclosure of which is incorporated herein), and other multilayer and/or non-wound cores. Any type of golf ball core can be used in the golf balls of the present invention. Preferred cores, however, comprise the polymers of the invention, and, most preferably, include some amount of cis-polybutadiene.

Typically, cores formed from the polymers of the invention may be compression or injection molded. Layers formed around the solid or wound cores may be formed by either compression molding preformed half-shells of the layer stock material or by injection molding the layer stock about the core. Half-shells for forming layers are made by injection molding a layer stock into a conventional half-shell mold in a conventional manner. The preferred method is compression molding layers from preformed half-shells.

The present invention can be used in forming golf balls of any desired size. While USGA specifications limit the size of a competition golf ball to more than 1.680 inches in diameter, golf balls of any size can be used for leisure golf play. The preferred diameter of the golf balls is at least 1.680 inches to about 1.800 inches.

In addition, the present invention can also be used in forming golf balls having more than one layer and/or a dual core ball, i.e., a ball with a core having two or more layers of differing hardness. In the case of a ball with two or more layers, the outer most layer may be softer or harder, depending upon the "playability" requirements desired, than the one or more layer(s) formed inwardly of the outermost layer.

All patents cited in the foregoing text are herein incorporated by reference in their entirety.

It will be understood that the claims are intended to cover all changes and modifications of the preferred embodiments of the invention, herein chosen for the purpose of illustration, which do not constitute a departure from the spirit and scope of the invention.

I claim:

1. A golf ball comprising a cover and a core, wherein the core comprises a saponified polymer prepared by a process comprising the following steps:
    (a) forming a polymer comprising: (1) a first monomeric component comprising a first olefinic monomer having from 2 to 8 carbon atoms; and (2) a second monomeric component comprising an unsaturated carboxylic acid based acrylate class ester having from 4 to 22 carbon atoms;
    (b) applying a sufficient amount of heat to the polymer to convert the polymer to a substantially molten state;
    (c) forming a mixture by adding at least one inorganic metal base to the molten polymer such that the viscosity of the mixture remains substantially unchanged from the viscosity of the molten polymer; followed by
    (d) applying a sufficient amount of heat to saponify the mixture to produce a polymer salt adapted for forming improved golf ball layers,
    wherein a sufficient amount of the inorganic metal base is added to the molten polymer in forming the mixture to obtain a degree of saponification of the polymer ranging between about 1 and 50 percent, and
    wherein the core has a flexural modulus of about 500 to about 300,000 psi, a hardness of about 40 Shore A to about 70 Shore D, and a specific gravity of about 0.7 or greater.

2. The golf ball of claim 1, wherein the golf ball has an Atti compression of at least 50 and a coefficient of restitution of at least 0.7.

3. The golf ball of claim 2, wherein the Atti compression is at least 60 to about 100.

4. The golf ball of claim 1, wherein the core has a flexural modulus of about 500 psi to about 150,000 psi.

5. The golf ball of claim 1, wherein the polymer further comprises a third monomeric component comprising at least one monomer selected from the group consisting of carbon monoxide, sulfur dioxide, an anhydride monomer, an unsaturated monocarboxylic acid, a second olefin having from 2 to 8 carbon atoms and a vinyl ester or a vinyl ether of an alkyl acid having from 4 to 21 carbon atoms.

6. The golf ball of claim 1, wherein the core further comprises at least one density-adjusting filler.

7. The golf ball of claim 6, the density adjusting filler is a metallic powder.

8. The golf ball of claim 7, wherein the metallic powder is a titanium, tungsten or copper powder.

9. The golf ball of claim 6, wherein the density adjusting filler is a metallic oxide derivative.

10. The golf ball of claim 9, wherein the metallic oxide derivative is an oxide derivative selected from the group consisting of titanium, tungsten, copper and tin.

11. The golf ball of claim 1, wherein the layer has a foamed structure.

12. The golf ball of claim 1, wherein the golf ball further comprises an intermediate layer.

13. The golf ball of claim 12, wherein the intermediate layer has a thickness of at least about 0.02 inches.

14. The golf ball of claim 12, wherein the intermediate layer has a hardness from at least 20 Shore D and flexural modulus at least 500 to about 100,000 psi.

15. The golf ball of claim 1, wherein the metal base is comprised of at least one metallic cation selected from the group consisting of lithium, sodium, potassium, magnesium, calcium, barium, lead, tin, zinc and aluminum.

16. The golf ball of claim 1, wherein the first monomeric component has the general formula:

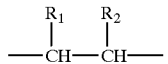

wherein:
$R_1$ is hydrogen or an alkyl group; and
$R_2$ is hydrogen, lower alkyl, carbocyclic or aromatic.

17. The golf ball of claim 1, wherein the second monomeric component is an unsaturated acrylate class ester having the general formula:

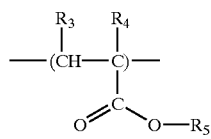

wherein:
$R_3$ is hydrogen or an alkyl group;
$R_4$ is hydrogen, lower alkyl, carbocyclic or aromatic;
$R_5$ is selected from the group consisting of $C_nH_{2n+1}$, for n=1 to 18 and phenyl, in which from 0 to 5 H within $R_5$ can be replaced by substituents selected from the group consisting of COOH, $SO_3H$, $NH_2$, succinic anhydride and their salts, or $R_5$ can be replaced by substituents selected from the group consisting of F, Cl, Br, I, OH, SH, epoxy, silicone, lower alkyl esters, lower alkyl ethers and aromatic rings, wherein optionally $R_4$ and $R_5$ can be combined to form a bicyclic ring.

18. The golf ball of claim 1, wherein the polymer filter comprises a third monomeric component comprising at least one monomer selected from the group consisting of:

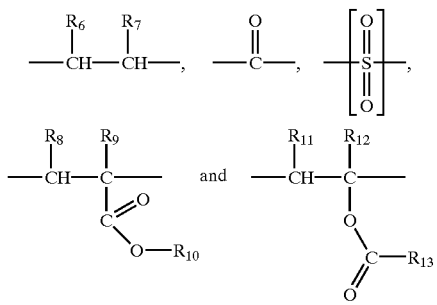

wherein:
$R_6$, $R_7$, $R_8$ and $R_{11}$ are independently hydrogen, alkyl, carbocyclic or aromatic;
$R_9$ and $R_{12}$ are independently hydrogen or alkyl;
$R_{10}$, is hydrogen, or is selected from the group consisting of $C_RH_{2n+1}$, for n=1 to 18 and phenyl, in which from 0 to 5 H within $R_{10}$, can be replaced by substituents selected from the group consisting of COOH, $SO_3H$, NH, and their salts, or $R_{10}$ can be replaced by substituents selected from the group consisting of F, Cl, Br, I, OH, SH, silicon, lower alkyl esters, lower alkyl ethers and aromatic rings, wherein optionally $R_9$ and $R_{10}$ can be combined to form a bicyclic ring;

$R_{13}$ is hydrogen, or is selected from the group consisting of $C_nH_{2n+1}$, for n=1 to 18 and phenyl, in which from 0 to 5 H within $R_{13}$, can be replaced by substituents selected from the group consisting of COOH, $SO_3H$, NH, and their salts, or $R_{13}$ can be replaced by substituents selected from the group consisting of F, Cl, Br, I, OH, SH, silicon, lower alkyl esters, lower alkyl ethers and aromatic rings, wherein optionally $R_{12}$ and $R_{13}$ can be combined to form a bicyclic ring.

19. The golf ball of claim 1, wherein the polymer is grafted by addition of a grafting agent.

20. The golf ball of claim 1, wherein the saponified polymer is blended with at least one additional thermoplastic ionomer.

21. The golf ball of claim 20, wherein the thermoplastic ionomer is at least one ionomer selected from the group consisting of ethylene methacrylic acid ionomers, ethylene acrylic acid ionomers, terpolymer ionomers comprising ethylene and methacrylic acid monomeric units, and terpolymer ionomers comprising ethylene and acrylic acid monomeric units.

22. The golf ball of claim 1, wherein the saponified polymer is blended with at least one non-ionic thermoplastic.

23. The golf ball of claim 22, wherein the non-ionic thermoplastic is at least one polymer selected from the group consisting of poly(butyl acrylate), poly(2-ethylbutyl acrylate), poly(heptyl acrylate), poly(silanes), block poly (ether-ester) copolymers, styrene-butadiene-styrene block copolymers, styrene-(ethylene-propylene)-styrene block copolymers, styrene-(ethylene-butylene)-styrene block copolymers, styrene-butadiene-styrene block copolymers comprising maleic anhydride functionality, styrene-(ethylene-propylene)-styrene block copolymers comprising maleic anhydride functionality, styrene-(ethylene-butylene)-styrene block copolymers comprising maleic anhydride functionality, styrene-butadiene-styrene block copolymers comprising sulfonic functionality, styrene-(ethylene-propylene)-styrene block copolymers comprising sulfonic functionality, styrene-(ethylene-butylene)-styrene block copolymers comprising sulfonic functionality, ethylene-acrylate copolymers, ethylene methacrylate copolymers, ethylene-octene copolymers made from metallocene catalysts, ethylene-alpha olefin copolymers and terpolymers made from metallocene catalysts, ethylene-alpha olefin copolymers and terpolymers made from non-metallocene single-site catalysts, block poly(urethane-ester) copolymers, block poly(urethane-ether) copolymers, block poly (urethane-caprolactone) copolymers, polycaprolactones, polyesters, polycarbonates, ethylene-propylene-(diene monomer) terpolymers, sulfonated derivatives of ethylene-propylene-(diene monomer) terpolymers, and carboxylated derivatives of ethylene-propylene-(diene monomer) terpolymers.

24. A golf ball according to claim 1, wherein the core is solid or fluid.

25. A golf ball according to claim 24, wherein the core is fluid and further comprises a tensioned elastomeric material disposed thereon.

26. The golf ball according to claim 25, wherein the tensioned elastomeric material further comprises natural or synthetic elastomers or blends thereof.

27. The golf ball of claim 1, wherein the saponified polymer of said layer has a Shore D hardness of at least 15, a flexural modulus of at least 500 psi, a specific gravity of at least 0.7, a dynamic shear modulus at 23° C. of at least $10^4$ dynes/cm$^2$ and a loss tangent of no more than about 1 at 23° C.

28. The golf ball of claim 27, wherein the flexural modulus of the saponified polymer is about 1000 psi to about 100,000 psi.

29. The golf ball of claim 27, wherein the specific gravity of the saponified polymer is at least 0.75 to about 1.

30. The golf ball of claim 27, wherein the dynamic shear storage modulus of the saponified polymer is about $10^6$ to about $10^{10}$ dynes/cm$^2$.

31. The golf ball of claim 27, wherein the loss tangent of the saponified polymer is no more than 0.1 at 23° C.

32. The golf ball of claim 12, wherein the intermediate layer comprises a saponified polymer.

33. The golf ball of claim 1, wherein the core further comprises cis-polybutadiene.

34. A golf ball comprising a cover and a core, wherein, the cover comprises an inner cover layer and an outer cover layer, and wherein the inner cover layer comprises a saponified polymer prepared by a process which comprises:
  (a) forming a polymer comprising: (1) a first monomeric component comprising a first olefinic monomer having from 2 to 8 carbon atoms; (2) a second monomeric component comprising an unsaturated carboxylic acid based acrylate class ester having from 4 to 22 carbon atoms; and (3) an optional third monomeric component comprising at least one monomer selected from the group consisting of carbon monoxide, sulfur dioxide, an anhydride monomer, an unsaturated monocarboxylic acid, a second olefin having from 2 to 8 carbon atoms and a vinyl ester or a vinyl ether of an alkyl acid having from 4 to 21 carbon atoms;
  (b) introducing the polymer into an inlet zone of an extruder comprising an inlet and at least one addition zone;
  (c) melting and mixing the polymer in the inlet zone;,
  (d) passing the molten polymer through an addition zone within the extruder;
  (e) forming a mixture at a first temperature above the melting temperature of the polymer and below a second temperature at which saponification takes place by adding a solution consisting essentially of at least one inorganic metal base and at least one nonaqueous solvent into the molten polymer as it passes through the addition zone such that the viscosity of the mixture remains substantially unchanged from the viscosity of the molten polymer; followed by
  (f) saponifying the mixture at the second temperature to produce a polymer salt adapted for use in forming a golf ball layer,
  wherein a sufficient amount of the inorganic metal base is added to the molten polymer in forming the mixture to obtain a degree of saponification of the polymer ranging between about 1 and 50 percent.

35. The golf ball of claim 34, wherein the core comprises at least one layer comprising a saponified polymer.

36. The golf ball of claim 35, wherein the extruder has at least two addition zones connected in series and wherein a portion of the metal base solution is added in each the addition zone.

37. The golf ball of claim 35, wherein the saponified polymer is blended with at least one additional thermoplastic ionomer.

38. A golf ball comprising a cover and a core, wherein the cover comprises an inner cover layer and an outer cover layer, and wherein the inner cover layer comprises a saponified polymer prepared by a process comprising the following steps:
  a) forming a polymer comprising (1) a first monomeric component comprising a first olefinic monomer having from 2 to 8 carbon atoms; (2) a second monomeric component comprising an unsaturated carboxylic acid based acrylate class ester having from 4 to 22 carbon atoms; and, optionally, (3) a third monomeric component comprising at least one monomer selected from the group consisting of carbon monoxide, sulfur dioxide, an anhydride monomer, an unsaturated monocarboxylic acid, a second olefin having from 2 to 8 carbon atoms, and a vinyl ester or a vinyl ether of an alkyl acid having from 4 to 21 carbon atoms;
  b) applying a sufficient amount of heat to the polymer to convert the polymer to a substantially molten state;
  c) forming a mixture by adding an inorganic metal base to the molten polymer such that the viscosity of the mixture remains substantially unchanged from the viscosity of the molten polymer; followed by
  d) applying a sufficient amount of heat to saponify the mixture to produce a polymer salt adapted for forming improved golf ball layers,
  wherein a sufficient amount of the inorganic metal base is added to the molten polymer in forming the mixture to obtain a degree of saponification of the polymer ranging between about 1 and 50 percent.

39. The golf ball of claim 38, wherein the inner cover layer has a thickness of at least about 0.02 inches.

40. The golf ball of claim 38, wherein the core comprises at least one layer comprising a saponified polymer.

* * * * *